United States Patent [19]
Famili et al.

[11] Patent Number: 5,369,168
[45] Date of Patent: Nov. 29, 1994

[54] REACTIVE MELT EXTRUSION GRAFTING OF THERMOPLASTIC POLYVINYL ALCOHOL/POLYOLEFIN BLENDS

[75] Inventors: Amir Famili, Orefield; Lloyd M. Robeson, Macungie; James F. Nangeroni, Allentown, all of Pa.

[73] Assignee: Air Products and Chemicals, Inc., Allentown, Pa.

[21] Appl. No.: 923,756

[22] Filed: Aug. 3, 1992

[51] Int. Cl.$^5$ .................. C08L 29/04; C08L 51/06; C08L 23/26
[52] U.S. Cl. .................. 525/57; 525/74; 525/78; 525/193; 525/197
[58] Field of Search .................. 525/57, 56, 59, 197, 525/193, 78; 264/211.24

[56] References Cited

U.S. PATENT DOCUMENTS

| | | | |
|---|---|---|---|
| 4,001,172 | 1/1977 | Steinkamp et al. | 524/504 |
| 4,362,844 | 12/1982 | Lemstra | 525/57 |
| 4,600,746 | 7/1986 | Schmuckler | 525/57 |
| 4,612,155 | 7/1986 | Wang et al. | 525/197 |
| 4,806,597 | 2/1989 | Gallucci et al. | 525/57 |
| 4,857,600 | 8/1989 | Gross et al. | 525/53 |
| 4,937,284 | 6/1990 | Bergstom | 525/57 |
| 4,943,399 | 7/1990 | Taubitz et al. | 264/211.24 |
| 4,950,513 | 8/1990 | Mehra | 428/367 |
| 5,230,935 | 7/1993 | Delimoy et al. | 525/57 |
| 5,260,371 | 11/1993 | Chen | 525/57 |
| 5,296,552 | 3/1994 | Ohmae et al. | 525/197 |

FOREIGN PATENT DOCUMENTS 52-51440 4/1977 Japan .................. 525/56

OTHER PUBLICATIONS

Borggreve, R. J. M., R. J. Gaymans, J. Schuijer, "Brittle-Tough Transition in Nylon-Rubber Blends: Effect of Rubber Concentration and Particle Size" Polymer, 1987, vol. 28 Aug. (1489-1496).

*Primary Examiner*—James J. Seidleck
*Assistant Examiner*—M. L. Warzel
*Attorney, Agent, or Firm*—Michael Leach; William F. Marsh

[57] ABSTRACT

A method for preparing a compatible blend of polyolefin and thermoplastic polyvinyl alcohol comprising:

(a) melting polyolefin in the initial elements of a melt extruder, (b) adding and melt blending an unsaturated carboxylic acid or anhydride with the melted polyolefin downstream in the extruder, (c) adding peroxide to the melt blend and grafting the unsaturated carboxylic acid or anhydride onto the polyolefin, and (d) melt blending thermoplastic PVOH into the grafted polyolefin/unsaturated carboxylic acid or anhydride melt mixture.

21 Claims, No Drawings

REACTIVE MELT EXTRUSION GRAFTING OF THERMOPLASTIC POLYVINYL ALCOHOL/POLYOLEFIN BLENDS

TECHNICAL FIELD

The present invention relates to melt extrudable blends of polyolefins and thermoplastic polyvinyl alcohol (PVOH) and, more particularly, relates to reactive extrusion grafted blends of polyolefins and thermoplastic PVOH.

BACKGROUND OF THE INVENTION

One of the more useful methods to modify polymers involves blending them with other polymers of different structures and properties. In fact, the subject of polymer blends has been one of the key research and development areas in the field of polymers in the past decade. In a few cases, polymer blend combinations are miscible, i.e., they exhibit thermodynamic miscibility and are mixed at the scale of molecular dimensions. These blends are mechanically compatible.

However, most blends are phase separated and generally exhibit poor mechanical compatibility. Phase separated systems in several cases can exhibit mechanical compatibility where the polymer compositions are similar, e.g., polyolefin blended with other polyolefins, or where interfacial agents are added to improve the compatibility at the interface between the constituents of the polymer blend.

For blends of polyolefins and PVOH, the extremes in polymer compatibility are expectedly observed. Polyolefins are very water insensitive whereas PVOH dissolves in water. Polyolefins are sensitive to hydrophobic compounds, e.g. oils and grease, whereas PVOH is very resistant.

Polymer blends of polyolefins and thermoplastic PVOH are melt processible, however, they exhibit very poor mechanical compatibility. This poor mechanical compatibility is manifested in the mechanical property profile of the blends relative to the properties of the unblended constituents where the blends suffer significantly in elongation at break, tensile strength and toughness. In addition, the blends exhibit non-homogeneity as noted in the injection molded surface and topology of the fractured samples for mechanical testing.

The utility of polyolefin/thermoplastic PVOH blends, if mechanical compatibility could be achieved, can be envisioned for many applications including barrier films, foam, injected molded articles and extrusion applications. The potential utility of polyolefin/thermoplastic PVOH blends has been noted in the patent literature. These patents note the poor mechanical compatibility of polyolefins and thermoplastic PVOH and many note various approaches towards solving this deficiency. Thus, modifications of polyolefin/thermoplastic PVOH blends are necessary in order to obtain useful properties.

U.S. Pat. No. 4,600,746 discloses the compatabilization of PVOH with a functional polymer, i.e., polyolefin or an ethylene-ester copolymer with groups capable of reacting with the hydroxyl of PVOH, e.g. carboxylic acid, anhydride, for barrier polymer blends. Ethylene-acrylic acid, ethylene-methacrylic acid, ionomers, and maleic anhydride grafted polyolefins are disclosed in blends with PVOH as melt processable alloys.

U.S. Pat. No. 4,950,513 discloses a laminate of a polyolefin, a melt blend of a polyamide and a PVOH, and an alkyl carboxyl-substituted polyolefin. The laminate is used as a barrier film composition.

U.S. Pat. No. 4,806,597 discloses a blend of an aromatic polycarbonate, polyolefin, ethylene-vinyl alcohol copolymer and a hydrogenated styrene/butadiene block copolymer modified with unsaturated dicarboxylic acid or anhydride.

U.S. Pat. No. 4,362,844 discloses a biaxially stretched mixture of polypropylene and an ethylene-vinyl alcohol copolymer. Coupling agents proposed to improve the compatibility include maleic anhydride or acrylic acid grafted polypropylene or ethylene-acrylic acid copolymers.

The above references disclose various methods involving modification of olefins to improve compatibility with PVOH. These methods comprise including polar groups in the polyolefin structure or potentially reactive groups, for example, carboxylic acid or anhydride functionality.

Borggreve, R. J. M., et al, "Brittle-Tough Transition In Nylon-Rubber Blends: Effect Of Rubber Concentration And Particle Size", POLYMER, 1987, Vol 28, August, (1489-1496) discloses a one-pass extrusion operation for polyolefin compatibilization with polyamides where the maleic anhydride is grafted to polyolefins utilizing peroxide.

SUMMARY OF THE INVENTION

The present invention provides a single pass, melt reactive extrusion compatibilization of polyolefin and a PVOH. The melt reactive grafting of unsaturated acids or anhydrides to polyolefins followed by reaction with thermoplastic PVOH provides mechanical compatibility which affords significant advantages over the prior art where a pregrafted polyolefin is mixed in a melt blending operation with the PVOH.

Specifically, the method for preparing a compatible blend of polyolefin and thermoplastic PVOH by single pass, melt reactive extruding comprises:

(1) melting polyolefin in a melt extruder;

(2) melt blending an unsaturated carboxylic acid or anhydride into the melted polyolefin;

(3) adding a free radical source to the melt blend and grafting the unsaturated carboxylic acid or anhydride onto the polyolefin;

(4) melt blending thermoplastic PVOH into the grafted polyolefin/unsaturated carboxylic acid or anhydride melt mixture, and optionally;

(5) extruding through a die; and (6) cooling and pelletizing.

Advantages of the single pass reactive melt extrusion compatibilization procedure include the following:

(a) uniformity of the blend leading to improved water resistance;

(b) the residual unsaturated carboxylic acid or anhydride can react with PVOH or plasticizer containing hydroxyl groups and thus not yield problems associated with residual material that will result if the constituents were prepared separately; and (c) an economic advantage in conducting the single reactive extrusion process instead of preparing, pelletizing and reextruding the grafted polyolefin with thermoplasic PVOH;

DETAILED DESCRIPTION OF THE INVENTION

The mechanical and visual compatability of blends of thermoplastic PVOH and various polyolefins is very poor. The present invention provides for the melt reactive extrusion grafting of an unsaturated carboxylic acid or anhydride onto the polyolefin followed by melt mixing with a thermoplastic PVOH in a single pass, thus eliminating the need to prepare a grafted polyolefin and recovering the product only to reextrude it with the thermoplastic PVOH in a second operation.

"Reactive extrusion" is the use of chemical reactions during polymer extrusion to form desired products. Free radical initiators, crosslinking agents, and other reactive additives can be injected into the extruder to cause these reactions.

The melt extruder used in the present extrusion operation is designed to conduct several operations during the preparation of the blends. The polyolefin is fed into the initial elements of the extruder. After melting the polyolefin in the initial elements, the unsaturated carboxylic acid or anhydride is fed into the extruder and, further down the extruder barrel, a free radical source such as a peroxide is fed to the extruder to yield improved grafting efficiency. After a length of extrusion sufficient to accomplish polyolefin grafting of the acid or anhydride, i.e., sufficient time, the thermoplastic PVOH is fed to the molten, grafted polyolefin stream either as pellets or powder through an open throat to the extruder or as a molten stream fed through a side stream extruder. After melt consolidation of the grafted polyolefin/thermoplastic PVOH blend, a vacuum port can optionally be used to removed ungrafted or unreacted maleic anhydride. Optionally, additional PVOH plasticizer can be pumped into the extruder after the vacuum port as makeup for any devolatilized PVOH plasticizer, if a low boiling plasticizer has been used.

The resulting reactive melt extrusion, compatibilized blend is extruded through die(s) at the end of the extruder and cooled on a chilled belt and pelletized, all procedures well known in the art. Water cooling can be used where higher levels of polyolefin are present in the blend, e.g., greater than 50% volume fraction.

While the above procedure is the preferred embodiment, other single pass extrusion conditions can be employed. Such processes would involve the addition of the acid or anhydride and peroxide at the same location along the extruder.

The polyolefins suitable for use in the present invention include polypropylene, polyethylene (including high density polyethylene, medium density polyethylene, low density polyethylene, linear low density polyethylene and linear very low density polyethylene), poly(butene-1) and ethylene-propylene rubber. Such polyolefins would have average molecular weights ranging from 20,000 to 2,000,000, preferably 50,000 to 700,000. Such polyolefins would have melt index values [44 psi (3.1 kg/cm$^2$), 190° C.] of 0.01 to 200 dg/min, preferably 0.5 to 40 dg/min.

The polyethylenes contemplated can be copolymerized with propylene, butene, hexene, octene and the like to achieve the various densities available for these materials. Ethylene copolymers such as ethylene-methyl acrylate copolymers, ethylene-ethyl acrylate copolymers, ethylene-vinyl acetate copolymers, ethylene-acrylic acid copolymers and ionomers, and ethylene-methacrylic acid copolymers and ionomers are additional polyolefins suitable for this invention. Also considered as a polyolefin for purposes of this invention are styrene-ethylene/butylene-styrene ABA block copolymers of greater than 50 wt % of the ethylene/butylene block.

The polyolefin content of the polyolefin/thermoplastic PVOH blend is 10–80 wt %, preferably 25–75 wt %.

A thermoplastic PVOH is required in the present process. As noted in a recent review of PVOH given by F. L. Marten in the *Encyclopedia Of Polymer Science And Engineering*, Second Ed., Vol 17, p 167, John Wiley & Sons, New York, 1989, several patents claim the preparation of extrudable PVOH using high boiling, water-soluble organic compounds containing hydroxyl groups. These compounds, for example glycerol, low molecular weight polyethylene glycols, are plasticizers which lower the melting point of PVOH into a processible range. Other suitable plasticizers such as sulfonamides are suitable if they are high boiling and miscible with PVOH.

The preferred thermoplastic PVOH for use in the present process, however, is that disclosed in U.S. Pat. No. 5,051,222 which is incorporated by reference. U.S. Pat. No. '222 discloses a thermoplastic PVOH prepared by a melt extrusion process which comprises adding sufficient energy to the PVOH (preferably with a plasticizer) to both melt the PVOH and essentially eliminate the crystallinity in the melt while simultaneously removing energy from the melt at a rate sufficient to avoid decomposition of the PVOH. Such thermoplastic PVOH's are commercially available from Air Products and Chemicals, Inc. under the VINEX trademark.

Suitable PVOH's have a 70–99+ mole % hydrolysis, preferably 78–94 mole %, and a degree of polymerization of 200 to 4000, preferably 300 to 1500.

In addition to plasticizers, the thermoplastic PVOH can contain other water soluble polymers such as poly(vinylpyrrolidone), poly(ethyloxazoline) and poly(ethylene oxide).

Also suitable as the thermoplastic PVOH are the hydrolysis product of a vinyl acetate copolymer which is at least 70 wt % vinyl acetate, especially ethylene-vinyl alcohol copolymers since they also exhibit poor mechanical compatibility with polyolefins. Ethylene content of up to 30 wt % can be used. These copolymers are produced by the hydrolysis of ethylene-vinyl acetate copolymers using methods similar to that for PVOH and are readily available commercially. Hydrolysis levels (based on vinyl acetate) of greater than 70 mole % are desired.

The amount of thermoplastic PVOH in the blend is 20–90 wt %, preferably 25–75 wt %.

Of the unsaturated carboxylic acids and anhydrides that are used for compatibilization of the polyolefin/thermoplastic PVOH blends, maleic anhydride is the preferred material. However, vinyl-containing carboxylic acids, such as acrylic acid or methacrylic acid can also be used, as can be mixtures of maleic anhydride and such carboxylic acids. The amount of the carboxylic acid or anhydride used will vary with the polyolefin selected, however, a range of 0.1 to 4 wt % based on polyolefin is desirable.

The free radical source suitable for use in the process are those materials typically used for polyolefin compounding and exhibiting free radical generation in the melt processing range typically used for polyolefins. Specific examples include 2,5-dimethyl-2,5-bis(t-butylperoxy)hexane; t-butylperoctoate; t-butylperoxypivalate; dicumylperoxide; 1,1-bis(t-butylperoxy)-3,3,5-trimethylcyclohexane; bis(t-butylperoxy-isopropyl)benzene and the like.

Blends of the reactive extruded polyolefin-PVOH compositions produced according to the present invention with PVOH, polyolefins or other polymers is also contemplated. Other polymers would include polystyrene, poly($\epsilon$-caprolactone), ABS, PVC, poly(methyl methacrylate), poly(vinylidene chloride), poly(vinylidene fluoride), styrene-maleic anhydride copolymers, poly(phenylene oxide)/polystyrene blends and the like.

Applications for the reactive extruded polyolefin-PVOH compositions produced according to the present invention include films, antistatic additives, injection molded articles, extruded profiles, fiber additives, foam and barrier containers. The reactive extruded compositions can be used as an adhesive interliner between films of polyolefins and PVOH. These compositions can be added to polyolefin or to PVOH, or to both, to improve the adhesion between layers of polyolefin and PVOH films.

REACTIVE MELT EXTRUSION PROCESS USED IN THE EXAMPLES

A twin screw extruder (Werner & Pfleiderer ZSK-40 extruder) was set-up to conduct the Runs as discussed in the following Examples. The screw design was held constant and the feed ports for the constituents of the blends were kept constant. The polyolefin was fed to the extruder using conventional equipment designed to deliver constant flow rates. Maleic anhydride was melted and fed to the extruder as a liquid at a position where the polyolefin stream was fluxed. At a position further down the barrel of the extruder the peroxide was fed (as a liquid) optionally diluted with xylene. A mixing zone was utilized to assure mixing of the maleic anhydride and peroxide with the polyolefin and to allow for sufficient grafting to occur. After this reactive extrusion stage, the thermoplastic PVOH pellets were fed to an open throat of the extruder. A mixing zone was utilized to blend the grafted polyolefin with the thermoplastic PVOH followed by a vacuum port to remove unreacted maleic anhydride. The product was extruded through six dies onto a chilled belt and pelletized.

EXAMPLE 1

The first series of Runs 1–7 involved blends of a thermoplastic PVOH (Vinex 2025: Air Products and Chemicals, Inc.) with polypropylene (Profax 6723: Himont). The feed rates of the thermoplastic PVOH, polypropylene, L-101 peroxide [2,5-dimethyl-2,5-bis(t-butylperoxy)hexane], and maleic anhydride are noted in Table 1. The extrusion temperature settings were 200° C. across the extruder. The melt flow data in Table 1 were obtained at 200° C. using a procedure similar to ASTM-D1238. Samples of the Runs were injection molded at 200° C. into test specimens with properties obtained dry and after 25 days at 50% R. H. conditioning. The mechanical properties (tensile modulus, tensile strength, ultimate elongation) were determined using procedures similar to ASTM-D638. Note that 1P, 5P, and 10P refer to 44 psi (3.1 kg/cm$^2$), 220 psi (15.5 kg/cm$^2$), and 440 psi (31 kg/cm$^2$) loading applied to the melt index apparatus. The notched impact strength was determined using the procedure described by ASTM D-256. The mechanical properties are noted in Table 1. The major difference noted was the improved homogeneity of the injection molded surface with addition of both maleic anhydride and peroxide. Additionally, the ultimate elongation showed a distinct improvement with reactive modification using maleic anhydride and peroxide.

TABLE 1

| RUN | 1 | 2 | 3 | 4 | 5 | 6 | 7 |
|---|---|---|---|---|---|---|---|
| Vinex 2025 Feed Rate (lb/hr) | 40 | 40 | 40 | 40 | 40 | 40 | 40 |
| Polypropylene Feed Rate (lb/hr) | 40 | 40 | 40 | 40 | 40 | 40 | 40 |
| Maleic Anhydride* | — | — | 1.5% | 1.5% | 3.0% | — | 0.75 |
| L-101 (peroxide)* Conc. (ppm) | — | — | 2300 | 4600 | 4600 | 4600 | 4600 |
| Vacuum | No | Yes | Yes | Yes | Yes | Yes | Yes |
| Melt Flow dg/min 200° C. (1P) | 8.5(1P) | 7.6(1P) | 5.8(5P) | 62.5(5P) | 37.7(5P) | 20.4(1P) | 14.8 |
| Mechanical Properties (Dry) Molded Surface | rough | rough | uniform | uniform | uniform | rough | uniform |
| Tensile Modulus (psi) | 197,000 | 198,000 | 189,000 | 189,000 | 162,000 | 193,000 | 204,000 |
| Tensile Strength (psi) | 4,800 | 4,500 | 4,600 | 4,900 | 4,000 | 4,400 | 4,500 |
| Elongation @ Break (%) | 6 | 6 | 16 | 17 | 16 | 5 | 10 |
| Notched Izod Impact Strength ft. lbs./in. of notch | 1.0 | 1.1 | 0.84 | 1.1 | 1.0 | 0.9 | 0.82 |

Mechanical Properties (50% RH: Conditioned for 25 days)

TABLE 1-continued

| RUN | 1 | 2 | 3 | 4 | 5 | 6 | 7 |
| --- | --- | --- | --- | --- | --- | --- | --- |
| Tensile Modulus (psi) | 197,000 | 194,000 | 174,000 | 185,000 | 176,000 | 168,000 | 175,000 |
| Tensile Strength (psi) | 4,230 | 4,140 | 4,210 | 4,680 | 4,590 | 3,960 | 4,190 |
| Elongation @ Break (%) | 6.0 | 5.0 | 14.0 | 21.3 | 17.6 | 6.3 | 8.8 |
| Notched Izod Impact Strength ft. lbs./in. of notch | 1.3 | 1.2 | 0.8 | 1.6 | 0.8 | 1.0 | 0.7 |

EXAMPLE 2

Runs 8–20 involved blends of Vinex 2025 thermoplastic PVOH and linear low density polyethylene (LLDPE) (Tuflin HS-7027: Union Carbide). The same extruder and extrusion conditions were employed as in Example 1 except for specific concentrations of the peroxide (L-101) and maleic anhydride. The specific Runs, and the property data of the resultant blends (controls and reactive extruded blends) are listed in Table 2. One blend (Run 20) utilized a 50/50 blend of LLDPE and polypropylene (Profax 6723) with Vinex 2025 PVOH. The property data were determined according to the procedures noted in Example 1. The addition of peroxide and/or maleic anhydride to the blends resulted in lower melt flow (higher melt viscosity). At higher levels of maleic anhydride and peroxide (Runs 11 and 12), the samples were too crosslinked to test. At the lower levels of maleic anhydride and peroxide, improved homogeneity of the blends was observed along with increased tensile strength and elongation at break compared to the control blend (Runs 8 and 9) as well as the blends with either peroxide or maleic anhydride addition (Runs 10 and 19).

TABLE 2

| RUN | 8 | 9 | 10 | 11 | 12 | 13 | 14 |
| --- | --- | --- | --- | --- | --- | --- | --- |
| Vinex 2025 Feed Rate (lb/hr) | 40 | 40 | 40 | 40 | 40 | 40 | 40 |
| LLDPE Feed Rate (lb/hr) | 40 | 40 | 40 | 40 | 40 | 40 | 40 |
| Maleic Anhydride* Conc. (%) | — | — | — | 3.0 | 3.0 | 1.0 | 1.25 |
| L-101 (peroxide)* Conc. (ppm) | | | 2000 | 2000 | 1000 | 1000 | 1000 |
| Vacuum | No | Yes | Yes | Yes | Yes | Yes | Yes |
| Melt Flow dg/min | 12.6(1P) | 12.0(1P) | 6.1(1P) | | | No flow (10P) | 14.4(10P) |
| Mechanical Properties (Dry) | | | | | | | |
| Tensile Modulus (psi) | 188,000 | 167,000 | 185,000 | Too Crosslinked to test | Too Crosslinked to test | 145,001 | 169,000 |
| Tensile Strength (psi) | 3,600 | 3,700 | 3,820 | | | 4,400 | 4,500 |
| Elongation @ Break (%) | 6 | 5 | 5 | | | 7 | 28 |
| Notched Izod Impact Strength ft. lbs./in. of notch | 1.2 | 1.3 | 1.3 | | | 1.2 | 1.3 |
| Mechanical Properties (50% RH: Conditioned for 25 days) | | | | | | | |
| Tensile Modulus (psi) | 139,000 | 163,000 | 145,000 | | | 126,000 | 122,000 |
| Tensile Strength (psi) | 2,950 | 3,094 | 3,239 | | | 3,390 | 3,550 |
| Elongation @ Break (%) | 6.3 | 6.8 | 5.7 | | | 7.3 | 38.8 |
| Notched Izod Impact Strength ft. lbs./in. of notch | 1.5 | 1.5 | 1.5 | | | 1.5 | 2.2 |
| RUN | 15 | 16 | 17 | 18 | 19 | 20 | |

TABLE 2-continued

| | | | | | | |
|---|---|---|---|---|---|---|
| Vinex 2025 Feed Rate (lb/hr) | 40 | 40 | 50 | — | 40 | 40 |
| LLDPE Feed Rate (lb/hr) | 40 | 40 | 50 | 40 | 40 | 40 |
| Maleic Anhydride* Conc. (%) | 0.5 | 0.5 | 0.5 | 0.5 | 0.5 | 1.0 |
| L-101 (peroxide)* Conc. (ppm) | 1000 | 500 | 500 | 500 | — | 1000 |
| Vacuum | Yes | Yes | Yes | Yes | Yes | Yes |
| Melt Flow dg/min | 23.9(10P) | 14.4(10P) | 21.4(10P) | 7.2(5P) | 3.34(1P) 1.88(10P) | |
| Mechanical Properties (Dry) | | | | | | |
| Tensile Modulus (psi) | 173,000 | 158,000 | 180,000 | 56,000 | 164,000 | 157,000 |
| Tensile Strength (psi) | 4,900 | 4,400 | 4,600 | 2,500 | 2,800 | 4,700 |
| Elongation @ Break (%) | 9 | 7 | 6 | 939 | 4 | 6 |
| Notched Izod Impact Strength ft. lbs./in. of notch | 1.0 | 1.0 | 1.1 | No break | 1.4 | 1.0 |
| Mechanical Properties (50% RH: Conditioned for 25 days) | | | | | | |
| Tensile Modulus (psi) | 139,000 | 134,000 | 127,000 | 58,000 | 143,000 | 139,000 |
| Tensile Strength (psi) | 3,980 | 3,645 | 3,660 | 2,610 | 2,350 | 4,015 |
| Elongation @ Break (%) | 18.5 | 11.1 | 10.0 | 978 | 6.0 | 6.3 |
| Notched Izod Impact Strength ft. lbs./in. of notch | 1.4 | 1.3 | 1.2 | No Break | 1.4 | 1.2 |

*Based on LLDPE weight
50/50 blend of LLDPE/Profax 6723 PP

EXAMPLE 3

Runs 21–27 involved blends of Vinex 2025 thermoplastic PVOH and ethylene-propylene rubber (Vistalon 719 EPR: Exxon). Except for the specific concentrations of the peroxide (L-101) and maleic anhydride, the same extruder and extrusion conditions were employed as in Example 1. The specific experiments and the property data of the resultant blends (controls and reactive extruded blends) are listed in Table 3. The reactive extruded blends (Runs 23–25 and 27) yielded higher tensile strength, higher elongation at break, and much higher notched izod impact strength than the control blend (Run 21) or the control blend with peroxide addition (Run 22). Maleic anhydride addition alone (Run 26) gave higher tensile strength and elongation relative to the control blend and the control blend with peroxide but not as good overall as the blends with both maleic anhydride and peroxide addition.

TABLE 3

| RUN | 21 | 22 | 23 | 24 | 25 | 26 | 27 |
|---|---|---|---|---|---|---|---|
| Vinex 2025 Feed Rate (lb/hr) | 48 | 48 | 48 | 48 | 48 | 48 | 48 |
| EPR Feed Rate (lb/hr) | 32 | 32 | 32 | 32 | 32 | 32 | 32 |
| Maleic Anhydride* Conc. (ppm) | — | — | 1.25 | 0.9 | 0.9 | 0.9 | 0.6 |
| L-101 (peroxide)* Conc. (ppm) | — | 1000 | 1000 | 1000 | 600 | — | 600 |
| Vacuum | Yes | Yes | Yes | Yes | Yes | Yes | Yes |
| Melt Flow dg/min | 61.1(5P) | 50.5(5P) | No flow (10P) | 0.95(10P) 4.91(10P) | 1.27(10P) | 1.18(10P) | |
| Mechanical Properties | | | | | | | |

TABLE 3-continued

| RUN | 21 | 22 | 23 | 24 | 25 | 26 | 27 |
|---|---|---|---|---|---|---|---|
| (Dry) | | | | | | | |
| Tensile Modulus (psi) | 117,000 | 124,000 | 153,000 | 143,000 | 164,000 | 151,000 | 139,000 |
| Tensile Strength (psi) | 3,500 | 3,200 | 5,200 | 5,300 | 5,400 | 5,500 | 5,100 |
| Elongation @ Break (%) | 9 | 7 | 81 | 78 | 73 | 16 | 88 |
| Notched Izod Impact Strength ft. lbs./in. of notch | 1.2 | 1.2 | 21.9 | 18.9 | 20.3 | 1.6 | 11.5 |
| Mechanical Properties (50% RH: Conditioned for 25 days) | | | | | | | |
| Tensile Modulus (psi) | 82,000 | 88,000 | 72,000 | 73,000 | 82,000 | 86,000 | 68,000 |
| Tensile Strength (psi) | 2,015 | 1,925 | 2,995 | 2,900 | 3,015 | 3,500 | 2,860 |
| Elongation @ Break (%) | 15.7 | 13.6 | 179 | 184 | 156 | 79 | 222 |
| Notched Izod Impact Strength ft. lbs./in. of notch | 1.5 | 1.6 | 20.8 | 19.6 | 22.8 | 10.8 | 19.3 |

*Based on EPR weight

EXAMPLE 4

Runs 28–31 involved blends of Vinex 2025 thermoplastic PVOH and a 75/25 blend of polypropylene (Profax 6723)/ethylene-propylene rubber (Vistalon 719). A thermoplastic PVOH/polyolefin blend ratio of 50/50 (by weight) was employed. Except for specific concentrations of the peroxide (L-101) and maleic anhydride, the same extruder and extrusion conditions were employed as noted in Example 1. The specific Runs and property data of the resultant blends (control and reactive extruded blends) are noted in Table 4. The data were obtained using the procedures noted in Example 1. The reactive extruded blends (Runs 28–30) exhibited significantly improved homogeneity over the blend control alone (Run 31) with increased tensile strength and ultimate elongation.

TABLE 4

| RUN | 28 | 29 | 30 | 31 | Vinex 2025 | Profax 6723 |
|---|---|---|---|---|---|---|
| Vinex 2025 Feed Rate (lb/hr) | 40 | 40 | 40 | 40 | Control | Control |
| Polyolefin Feed Rate (lb/hr) | 40 | 40 | 40 | 40 | | |
| Maleic Anhydride* Conc. (ppm) | 0.5 | 1.0 | 1.0 | — | | |
| L-101 (peroxide)* Conc. (ppm) | 500 | 1000 | 2000 | — | | |
| Vacuum | Yes | Yes | Yes | Yes | | |
| Melt Flow dg/min | 12.0(10P) | 1.44(10P) | 17.1(10P) | 6.3(1P) | 55.2(5P) | 83.2(10P) |
| Mechanical Properties (Dry) | | | | | | |
| Tensile Modulus (psi) | 164,000 | 180,000 | 146,000 | 162,000 | 283,000 | 127,000 |
| Tensile Strength (psi) | 4,800 | 5,200 | 4,800 | 4,400 | 10,570 | 5,100 |
| Elongation @ Break (%) | 6 | 25 | 33 | 5 | 55 | 58 |
| Notched Izod Impact Strength ft. lbs./in. of notch | 0.83 | 1.23 | 1.50 | 1.1 | 0.69 | 2.2 |
| Mechanical Properties (50% RH: Conditioned for 25 days) | | | | | | |
| Tensile Modulus (psi) | 157,000 | 169,000 | 135,000 | 156,000 | 120,000 | 137,000 |
| Tensile | 4,400 | 4,580 | 4,275 | 3,640 | 4,170 | 5,105 |

TABLE 4-continued

| RUN | 28 | 29 | 30 | 31 | Vinex 2025 | Profax 6723 |
|---|---|---|---|---|---|---|
| Strength (psi) | | | | | | |
| Elongation @ Break (%) | 7.1 | 38.9 | 79.6 | 6.3 | 226 | 65.3 |
| Notched Izod Impact Strength ft. lbs./in. of notch | 1.1 | 1.9 | 2.8 | 1.6 | 38.1 | 2.2 |

*Based on Polyolefin weight
75/25 Polypropylene/EPR

EXAMPLE 5

This Example compares a pregrafted polyolefin melt extruded with a thermoplastic PVOH (Run A) as taught in U.S. Pat. No. 4,600,746 (essentially a two pass operation) with the single pass, reactive extrusion process according to the present invention.

The maleic anhydride grafted polyethylene produced in Run 18 was recovered as pellets. The Run 18 pellets were blended with 50% by weight of thermoplastic PVOH (Vinex 2025) in a 1" Killion extruder 30/1 L/D at 200° C. The resultant product (Run A) was injection molded into test specimens. The tensile properties of the Run A sample were significantly improved over the control samples (Runs 8 and 9). The Run A blend, however, was deeper in color (yellow) than either Runs 8 and 9 (control) or the reactive extrusion Runs.

Additionally, the Run A blend exhibited poor water resistance. Samples of Run A were placed in water at 23° C. along with samples of Run 9 (control) and Runs 13 and 16 (reactive extrusion). The sample of Run A became sticky on the surface when exposed to water, and water immersion (24 hours) resulted in sample disintegration. Samples of Runs 9, 13 and 16 did not exhibit the same degree of surface stickiness when exposed to water and did not disintegrate after 24 hour water immersion although they exhibited some swelling and surface softness. The improved water resistance is of significant benefit for certain barrier film applications.

EXAMPLE 6

A blend of 50% Vinex 2025 PVOH and 50% of the reactive extrusion blend of Run 23 (Vinex 2025/EPR: 60/40) was prepared in a 1" Killion extruder at 200° C. The resultant pelletized blend was injection molded at 200° C. and mechanical properties were obtained on dry samples as noted in Table 5.

EXAMPLE 7

A blend of 50% Vinex 2025 PVOH and 50% of the reactive extrusion blend of Run 25 (Vinex 2025/EPR: 60/40) was prepared in a 1" Killion extruder at 200° C. The resultant pelletized blend was injection molded at 200° C. and mechanical properties were obtained on dry samples as noted in Table 5.

EXAMPLE 8

A blend of 75% Vinex PVOH 2025 and 25% of the reactive extrusion blend of Run 25 (Vinex 2025/EPR: 60/40) was prepared in a 1" Killion extruder at 200° C. The resultant pelletized blend was injection molded at 200° C. and mechanical properties were obtained on dry samples as noted in Table 5.

TABLE 5

| Example | Composition | Tensile Modulus (psi) | Tensile Strength | % Elongation | Impact Strength ft. lbs/ in of notch |
|---|---|---|---|---|---|
| 6 | 50% Vinex 2025 50% Run 23 | 282,000 | 8,986 | 40 | 4.1 |
| 7 | 50% Vinex 2025 50% Run 25 | 288,000 | 9,178 | 26 | 5.8 |
| 8 | 75% Vinex 2025 25% Run 25 | 315,000 | 11,375 | 27 | 1.4 |

EXAMPLE 9

Blends of polypropylene (Profax 6723) and Vinex 2034 PVOH were extruded with variations in maleic anhydride and peroxide (L-101) addition. The data for Runs 41-49 are shown in Table 6. Runs 47-49 were at different Vinex/PP ratios.

TABLE 6

| RUN | 41 | 42 | 43 | 44 | 45 | 46 |
|---|---|---|---|---|---|---|
| Vinex ™ Type | 2034 | 2034 | 2034 | 2034 | 2034 | 2034 |
| Vinex Feed Rate (lbs/hr) | 40 | 40 | 40 | 40 | 40 | 40 |
| Polyolefin Type | PP Profax 6723 | PP Profax 6723 | PP Profax 6723 | PP Profax 6723 | PP Profax 6723 | PP Profax 6723 |
| Polyolefin Feed Rate (lbs/hr) | 40 | 40 | 40 | 40 | 40 | 40 |
| Maleic Anhydride Conc. (%)* | — | — | 2.2% | 2.2% | 3.2% | 3.2% |
| L-101 (peroxide) Conc. (ppm)* | — | — | 3000 | 4000 | 4000 | 3000 |
| Melt Flow dg/min (200° C.) | 10.2(1P) | 8.3(1P) | 62.6(10P) | 110(10P) | 86.8(10P) | |
| Mechanical Properties (Dry) | | | | | | |
| Tensile Modulus (psi) | 110,000 | 110,000 | 124,000 | 124,000 | 137,000 | 140,000 |

TABLE 6-continued

| | | | | | | |
|---|---|---|---|---|---|---|
| Tensile Strength (psi) | 3,100 | 3,100 | 4,900 | 4,900 | 5,000 | 5,100 |
| Elongation @ Break (%) | 16 | 17 | 105 | 126 | 91 | 101 |
| Notched Izod Impact Strength ft-lbs/in of notch | 1.1 | 1.5 | 0.78 | 0.77 | 0.82 | 0.78 |
| Mechanical Properties (50% RH: Conditioned for 25 days) | | | | | | |
| Tensile Modulus (psi) | 96,000 | 86,000 | 107,000 | 104,000 | 99,000 | 108,000 |
| Tensile Strength (psi) | 3,000 | 2,800 | 4,200 | 4,200 | 4,200 | 4,200 |
| Elongation @ Break (%) | 21 | 24 | 262 | 133 | 201 | 358 |
| Notched Izod Impact Strength ft-lbs/in of notch | 2.0 | 2.0 | 1.0 | 0.90 | 1.0 | 1.0 |

| RUN | 47 | 48 | 49 |
|---|---|---|---|
| Vinex ™ Type | 2034 | 2034 | 2034 |
| Vinex Feed Rate (lbs/hr) | 74 | 50 | 50 |
| Polyolefin Type | PP Profax 6723 | PP Profax 6723 | PP Profax 6723 |
| Polyolefin Feed Rate (lbs/hr) | 40 | 27 | 16 |
| Maleic Anhydride Conc. (%)* | 2.2% | 2.1% | 3.5% |
| L-101 (peroxide) Conc. (ppm)* | 4000 | 4000 | 4000 |
| Melt Flow dg/min (200° C.) | 44.9(10P) | 10.0(10P) | 15.8(10P) |
| Mechanical Properties (Dry) | | | |
| Tensile Modulus (psi) | 110,000 | 126,000 | 124,000 |
| Tensile Strength (psi) | 4,600 | 4,800 | 3,400 |
| Elongation @ Break (%) | 75 | 11 | 9 |
| Notched Izod Impact Strength ft-lbs/in of notch | 0.81 | 0.68 | 0.89 |
| Mechanical Properties (50% RH: Conditioned for 25 days) | | | |
| Tensile Modulus (psi) | 83,000 | 75,000 | 59,000 |
| Tensile Strength (psi) | 3,800 | 3,700 | 2,400 |
| Elongation @ Break (%) | 148 | 33 | 37 |
| Notched Izod Impact Strength ft-lbs/in of notch | 1.1 | 0.95 | 1.6 |

*Based on polyolefin weight

EXAMPLE 10

Blends of polypropylene (Profax 8623) and Vinex 2034 were prepared via reactive extrusion. Profax 8623 PP is an impact grade polypropylene. The data for Runs 50–54 are shown in Table 7.

EXAMPLE 11

Blends of polypropylene (Profax 8623) and Vinex 2025 PVOH were prepared for comparison with similar blends employing Vinex 2034 PVOH. The data for Runs 55–57 are shown in Table 8. Vinex 2034 PVOH yielded much higher ultimate elongation with Profax 8623 PP than similar blends with Vinex 2025 PVOH. Reactive extrusion yielded significant improvements for both blends.

TABLE 7

| RUN | 50 | 51 | 52 | 53 | 54 |
|---|---|---|---|---|---|
| Vinex ™ Type | 2034 | 2034 | 2034 | 2034 | 2034 |
| Vinex Feed Rate (lbs/hr) | 40 | 40 | 40 | 40 | 40 |
| Polyolefin Type | PP Profax 8623 | PP Profax 8623 | PP Profax 8623 | PP Profax 8623 | PP Profax 8623 |
| Polyolefin Feed Rate (lbs/hr) | 40 | 40 | 40 | 40 | 40 |
| Maleic Anhydride Conc. (%)* | — | 2.0% | 3.5% | 2.1% | 3.1% |
| L-101 (peroxide) Conc. (ppm)* | — | 4000 | 3000 | 3000 | 4000 |
| Melt Flow dg/min (200° C.) | 7.9(1P) | 102.2(10P) | 27.5(10P) | 59.0(10P) | 28.1(10P) |
| Mechanical Properties (Dry) | | | | | |
| Tensile Modulus (psi) | 111,000 | 111,000 | 109,000 | 114,000 | 113,000 |
| Tensile Strength (psi) | 3,400 | 3,900 | 4,000 | 4,000 | 3,900 |
| Elongation @ Break (%) | 16 | 153 | 104 | 87 | 124 |
| Notched Izod Impact Strength ft-lbs/in of notch | 1.9 | 1.1 | 1.1 | 1.2 | 1.1 |
| Mechanical Properties (50% RH: Conditioned for 25 days) | | | | | |
| Tensile Modulus (psi) | 72,000 | 85,000 | 77,000 | 64,000 | 75,000 |
| Tensile Strength (psi) | 2,800 | 3,800 | 3,200 | 3,200 | 3,300 |
| Elongation @ Break (%) | 37 | 494 | 325 | 280 | 349 |
| Notched Izod Impact Strength ft-lbs/in of notch | 2.7 | 1.7 | 2.1 | 2.0 | 2.0 |

*Based on polyolefin weight

TABLE 8

| Run | 55 | 56 | 57 | 58 |
|---|---|---|---|---|
| Vinex ™ Type | 2025 | 2025 | 2025 | 2025 |
| Vinex Feed Rate (lbs/hr) | 40 | 40 | 40 | 40 |

TABLE 8-continued

| Run | 55 | 56 | 57 | 58 |
|---|---|---|---|---|
| Polyolefin Type | PP Profax 8623 | PP Profax 8623 | PP Profax 8623 | PP Profax 6723 |
| Polyolefin Feed Rate (lbs/hr) | 40 | 40 | 40 | 40 |
| Maleic Anhydride Conc. (%)* | 3.1% | 2.0% | — | 2.1% |
| L-101 (peroxide) Conc. (ppm)* | 4000 | 3000 | — | 3000 |
| Melt flow dg/min (200° C.) | 28.4(10P) | 2.5(1P) | 11.7(1P) | 3.2(1P) |
| Mechanical Properties (Dry) | | | | |
| Tensile Modulus (psi) | 158,000 | 168,000 | 179,000 | 179,000 |
| Tensile Strength (psi) | 4,100 | 4,100 | 4,500 | 5,100 |
| Elongation @ Break (%) | 34 | 18 | 5 | 19 |
| Notched Izod Impact Strength ft-lbs/in of notch | 1.3 | 1.1 | 1.3 | 0.84 |
| Mechanical Properties (50% R.H. Conditioning for 25 days) | | | | |
| Tensile Modulus (psi) | 112,000 | 116,000 | 135,000 | 151,000 |
| Tensile Strength (psi) | 3,600 | 3,600 | 4,000 | 4,700 |
| Elongation @ Break (%) | 45 | 29 | 11 | 34 |
| Notched Izod Impact Strength ft-lbs/in of notch | 1.6 | 1.1 | 1.5 | 0.70 |

*Based on polyolefin weight

EXAMPLE 12

A 50/50 blend of Vinex 2025 PVOH/Profax 6723 PP (Run 58 of Table 8) was made for comparison with Vinex 2034 PVOH/Profax 6723 PP reactive extruded blends. Vinex 2034 PVOH offered significantly higher ultimate elongation.

EXAMPLE 13

50/50 blends of Vinex 2025/LLDPE (LL-1002; Exxon Chemical) were prepared and subjected to reactive extrusion conditions. The data for Runs 59-62 are shown in Table 9. Polyethylene led to crosslinking with peroxide addition unlike polypropylene for which chain scission dominated resulting in high melt viscosity. Consequently, much lower levels of maleic anhydride and peroxide were employed. The addition of maleic anhydride and peroxide led to significant improvements in ultimate elongation, tensile strength and notched toughness except for Run 62 which appeared anomalous.

TABLE 9

| Run | 59 | 60 | 61 | 62 |
|---|---|---|---|---|
| Vinex ™ Type | 2025 | 2025 | 2025 | 2025 |
| Vinex Feed Rate (lbs/hr) | 40 | 40 | 40 | 40 |
| Polyolefin Type | LLDPE LL-1002 | LLDPE LL-1002 | LLDPE LL-1002 | LLDPE LL-1002 |
| Polyolefin Feed Rate (lbs/hr) | 40 | 40 | 40 | 40 |
| Maleic Anhydride Conc. (%)* | 0.5% | 0.5% | — | 0.62% |
| L-101 (peroxide) Conc. (ppm)* | 600 | 400 | — | ~400 |
| Melt flow dg/min (200° C.) | 0.9(10P) | 2.3(10P) | 11.5(1P) | 1.4(10P) |
| Mechanical Properties (Dry) | | | | |
| Tensile Modulus (psi) | 135,000 | 132,000 | 124,000 | 120,000 |
| Tensile Strength (psi) | 4,300 | 4,600 | 3,200 | 3,700 |
| Elongation @ Break (%) | 85 | 52 | 7 | 7 |
| Notched Izod Impact Strength ft-lbs/in of notch | 3.4 | 1.9 | 1.3 | 1.2 |
| Mechanical Properties (50% R.H. Conditioning for 25 days) | | | | |
| Tensile Modulus (psi) | 52,000 | 62,000 | 75,000 | 74,000 |
| Tensile Strength (psi) | 3,200 | 3,100 | 2,300 | 2,600 |
| Elongation @ Break (%) | 171 | 120 | 30 | 12 |
| Notched Izod Impact Strength ft-lbs/in of notch | N.B.** | 11.8 | 2.1 | 1.4 |

*Based on polyolefin weight
**N.B. = No Break

EXAMPLE 14

Runs 63-66 were 50/50 blends of Vinex 2034 PVOH and LLDPE (HS-7027) which offered significant improvements in ultimate elongation and tensile strength with maleic anhydride and peroxide addition as shown in Table 10.

TABLE 10

| Run | 63 | 64 | 65 | 66 | 67 | 68 |
|---|---|---|---|---|---|---|
| Vinex ™ Type | 2034 | 2034 | 2034 | 2034 | 2034 | 2034 |
| Vinex Feed Rate (lbs/hr) | 40 | 40 | 40 | 40 | 60 | 60 |
| Polyolefin Type | LLDPE HS-7027 | LLDPE HS-7027 | LLDPE HS-7027 | LLDPE HS-7027 | PP 6723/ EPR-719 | PP 6723/ EPR-719 |
| Polyolefin Feed Rate (lbs/hr) | 40 | 40 | 40 | 40 | 30/10 | 30/10 |
| Maleic Anhydride Conc. (%)* | 0.75% | 0.75% | 0.5% | — | 2.2% | 2.4% |
| L-101 (peroxide) Conc. (ppm)* | 400 | 600 | 600 | — | 1900 | 1900 |

TABLE 10-continued

| Run | 63 | 64 | 65 | 66 | 67 | 68 |
|---|---|---|---|---|---|---|
| Melt flow dg/min (200° C.) | 2.3(10P) | 2.3(10P) | 10.6(10P) | 9.2(10P) | 10.6(10P) | 2.9(10P) |
| Mechanical Properties (Dry) | | | | | | |
| Tensile Modulus (psi) | 87,000 | 87,000 | 87,000 | 77,000 | 108,000 | 109,000 |
| Tensile Strength (psi) | 3,600 | 3,800 | 3,500 | 2,700 | 4,200 | 4,300 |
| Elongation @ Break (%) | 25 | 147 | 100 | 23 | 73 | 55 |
| Notched Izod Impact Strength ft-lbs/in of notch | 1.2 | 2.6 | 1.4 | 1.5 | 1.4 | 1.3 |
| Mechanical Properties (50% R.H. Conditioning for 25 days) | | | | | | |
| Tensile Modulus (psi) | 52,000 | 40,000 | 47,000 | 48,000 | 61,000 | 75,000 |
| Tensile Strength (psi) | 2,900 | 3,100 | 2,800 | 2,300 | 3,400 | 3,500 |
| Elongation @ Break (%) | 53 | 235 | 135 | 41 | 99 | 79 |
| Notched Izod Impact Strength ft-lbs/in of notch | 2.2 | N.B.** | 6.6 | 2.0 | 3.5 | 2.6 |

*Based on polyolefin weight
**No break

EXAMPLE 15

Runs 67 and 68 involved a 60/30/10 blend of Vinex 2034/Profax 6723/EPR-719. See Table 10 for data.

EXAMPLE 16

Surlyn 9020/Vinex PVOH blends without reactive extrusion exhibit reasonable mechanical compatibility. Runs 69-76 were conducted with reactive extrusion processing. As shown in Table 11, modest improvements in tensile strength were observed with reactive processing. However, lower ultimate elongation was observed. In this case, reactive extrusion is not necessary and not desired except where improved water resistance may be required as exemplified in Example 5.

EXAMPLE 17

Vinex 2025/Surlyn 8660 blends (Runs 77 and 78) were prepared via reactive extrusion and no advantage of reactive processing versus the control (Run 79) is clear from Table 11 other than where improved water resistance is required as exemplified in Example 5.

TABLE 11

| Run | 69 | 70 | 71 | 72 | 73 | 74 |
|---|---|---|---|---|---|---|
| Vinex ™ Type | 2025 | 2025 | 2025 | 2025 | 2025 | 2025 |
| Vinex Feed Rate (lbs/hr) | 40 | 40 | 40 | 40 | 40 | 40 |
| Polyolefin Type | Surlyn 9020 | Surlyn 9020 | Surlyn 9020 | Surlyn 9020 | Surlyn 9020 | Surlyn 9020 |
| Polyolefin Feed Rate (lbs/hr) | 40 | 40 | 40 | 40 | 40 | 40 |
| Maleic Anhydride Conc. (%)* | — | — | 0.4% | 0.4% | 0.6% | 0.6% |
| L-101 (peroxide) Conc. (ppm)* | — | 400 | 400 | 600 | 600 | — |
| Melt flow dg/min (200° C.) | 80.0(5P) | 58.8(5P) | 30.2(5P) | 11.2(5P) | 10.8(5P) | 9.8(5P) |
| Mechanical Properties (Dry) | | | | | | |
| Tensile Modulus (psi) | 63,000 | 138,000 | 134,000 | 130,000 | 145,000 | 123,000 |
| Tensile Strength (psi) | 3,500 | 4,800 | 4,800 | 4,800 | 5,100 | 5,000 |
| Elongation @ Break (%) | 291 | 114 | 174 | 147 | 78 | 24 |
| Notched Izod Impact Strength ft-lbs/in of notch | 3.4 | 1.7 | 2.5 | 1.9 | 2.3 | 1.9 |
| Mechanical Properties (50% R.H. Conditioning for 25 days) | | | | | | |
| Tensile Modulus (psi) | 28,000 | 84,000 | 83,000 | 83,000 | 92,000 | 39,000 |
| Tensile Strength (psi) | 3,350 | 3,900 | 3,700 | 3,700 | 3,700 | 3,300 |
| Elongation @ Break (%) | 403 | 281 | 246 | 202 | 131 | 257 |
| Notched Izod Impact Strength ft-lbs/in of notch | 8.2 | 4.1 | 3.4 | 4.1 | 3.7 | 3.2 |
| Run | 75 | 76 | 77 | 78 | 79 | |
| Vinex ™ Type | 2025 | 2034 | 2025 | 2025 | 2025 | |
| Vinex Feed Rate (lbs/hr) | 40 | 40 | 40 | 40 | 40 | |
| Polyolefin Type | Surlyn 9020 | Surlyn 9020 | Surlyn 8660 | Surlyn 8660 | Surlyn 8660 | |
| Polyolefin Feed Rate (lbs/hr) | 40 | 40 | 40 | 40 | 40 | |
| Maleic Anhydride Conc. (%)* | 0.5% | 0.5% | 0.75% | 1.0% | — | |
| L-101 (peroxide) Conc. (ppm)* | 500 | 500 | 500 | 1000 | — | |
| Melt flow dg/min (200° C.) | 16.3(5P) | 10.4(5P) | 26.8(1P) | 22.0(1P) | 32.2(1P) | |
| Mechanical Properties (Dry) | | | | | | |
| Tensile Modulus (psi) | 140,000 | 80,000 | 141,000 | 83,000 | 160,000 | |
| Tensile Strength (psi) | 5,100 | 3,900 | 5,200 | 2,950 | 5,400 | |
| Elongation @ Break (%) | 89 | 171 | 54 | 16 | 87 | |
| Notched Izod Impact Strength ft-lbs/in of notch | 2.9 | 3.4 | 0.92 | 0.64 | 0.76 | |
| Mechanical Properties (50% R.H. Conditioning for 25 days) | | | | | | |
| Tensile Modulus (psi) | 83,000 | 73,000 | 92,000 | 59,000 | 126,000 | |
| Tensile Strength (psi) | 4,100 | 3,500 | 3,800 | 2,300 | 4,400 | |
| Elongation @ Break (%) | 202 | 94 | 343 | 23 | 248 | |
| Notched Izod Impact Strength | 6.3 | 8.9 | 1.1 | 0.85 | 1.1 | |

TABLE 11-continued ft-lbs/in of notch

*Based on polyolefin weight

EXAMPLE 18

Blends of 50/50 Vinex 2025/Primacor 5981 (high melt flow EAA - 20 wt % AA) were prepared as Runs 80 and 81. Reactive extrusion (Run 81) improved the strength, elongation and toughness. A different ratio Vinex 2025/Primacor 5981 (54/36) in control Run 82 was prepared to determine if a high melt flow product would be obtained.

A control Run 83 and a reactive extruded blend of Primacor 1430/Vinex 2025 (50/50) (Run 84) were prepared. Primacor 1430 EAA is a high molecular ethylene-acrylic acid copolymer (~8 wt % AA; Dow Chemical Co.) that offers fair mechanical compatibility with Vinex PVOH. The data for Runs 80-84 are shown in Table 12. Reactive extrusion only shows an improvement in notched toughness with decreases in elongation and tensile strength.

EXAMPLE 20

Blends of Vinex 2025 PVOH and an ethylene-vinyl acetate copolymer (LD-706; Exxon Chemical) were prepared as Runs 89-92 of Table 13. Definite improvements in tensile strength, ultimate elongation and notched toughness were observed with reactive extrusion.

EXAMPLE 21

Blends of Vinex 2025 PVOH and Vistalon ethylene-propylene rubber (EPR 3708; Exxon Chemical) were prepared (Runs 93-96). Significant improvements were observed in ultimate elongation, tensile strength and notched toughness at the higher maleic anhydride/peroxide levels as shown in Table 13.

EXAMPLE 22

TABLE 12

| Run | 80 | 81 | 82 | 83 | 84 |
|---|---|---|---|---|---|
| Vinex TM Type | 2025 | 2025 | 2025 | 2025 | 2025 |
| Vinex Feed Rate (lbs/hr) | 40 | 40 | 54 | 40 | 40 |
| Polyolefin Type | Primacor 5981 | Primacor 5981 | Primacor 5981 | Primacor 1430 | Primacor 1430 |
| Polyolefin Feed Rate (lbs/hr) | 40 | 40 | 36 | 40 | 40 |
| Maleic Anhydride Conc. (%)* | — | 0.5% | — | — | 0.5% |
| L-101 (peroxide) Conc. (ppm)* | — | 500 | — | — | 500 |
| Melt flow dg/min (200° C.) | 17.0(1P) | 7.3(1P) | 3.4(1P) | 5.4(1P) | 3.0(5P) |
| Mechanical Properties (Dry) | | | | | |
| Tensile Modulus (psi) | 37,000 | 36,000 | 45,000 | 141,000 | 109,000 |
| Tensile Strength (psi) | 1,700 | 2,000 | 2,400 | 4,700 | 4,000 |
| Elongation @ Break (%) | 20 | 71 | 39 | 100 | 61 |
| Notched Izod Impact Strength ft-lbs/in of notch | 0.53 | 0.89 | 0.80 | 0.80 | 1.5 |
| Mechanical Properties (50% R.H. Conditioning for 25 days) | | | | | |
| Tensile Modulus (psi) | 33,000 | 36,000 | 43,000 | 102,000 | 87,000 |
| Tensile Strength (psi) | 1,500 | 2,200 | 2,600 | 3,800 | 3,600 |
| Elongation @ Break (%) | 20 | 64 | 47 | 306 | 134 |
| Notched Izod Impact Strength ft-lbs/in of notch | 0.59 | 0.77 | 0.68 | 1.3 | 2.2 |

*Based on polyolefin weight

EXAMPLE 19

Runs 85-88 were performed to determine if the reactive extrusion procedure was applicable to ethylene/vinyl alcohol copolymers (e.g. EVAL EP-F). The results in Table 13 show only a modest increase in elongation and thus indicates that reactive extrusion is of more benefit to PVOH.

Run 97 involved the normal addition of Vinex 2034 PVOH after addition of maleic anhydride and peroxide to the polypropylene. Run 98 involved addition of both Vinex 2034 PVOH and polypropylene to the front of the extruder followed by maleic anhydride and peroxide addition. The results in Table 13 clearly show that this procedure is not desired for the conditions of this experiment. The maleic anhydride probably crosslinks the PVOH, the peroxide degrades the polypropylene and minimal grafting occurs. However, low maleic anhydride levels with ethylene-based polyolefins may be of interest using this approach.

TABLE 13

| Run | 85 | 86 | 87 | 88 | 89 | 90 |
|---|---|---|---|---|---|---|
| Vinex TM Type | EVAL EP-F | EVAL EP-F | EVAL EP-F | EVAL EP-F | 2025 | 2025 |
| Vinex Feed Rate (lbs/hr) | 40 | 40 | 40 | 40 | 40 | 40 |
| Polyolefin Type | PP Profax 6723 | PP Profax 6723 | PP Profax 6723 | PP 6723/ EPR-719 | LD-706 EVA | LD-706 EVA |
| Polyolefin Feed Rate (lbs/hr) | 40 | 40 | 40 | 30/10 | 40 | 40 |
| Maleic Anhydride Conc. (%)* | — | — | 1.0% | 1.0% | — | 0.5% |
| L-101 (peroxide) Conc. (ppm)* | — | 1500 | 1500 | 1500 | — | 500 |
| Melt flow dg/min (200° C.) | 4.5(1P) | 17.6(1P) | 9.7(1P) | 3.9(5P) | 18.2(1P) | |

TABLE 13-continued

| Mechanical Properties (Dry) | | | | | | |
|---|---|---|---|---|---|---|
| Tensile Modulus (psi) | 190,000 | 185,000 | 168,000 | 129,000 | 96,000 | 67,000 |
| Tensile Strength (psi) | 5,600 | 4,800 | 4,700 | 3,300 | 2,300 | 2,700 |
| Elongation @ Break (%) | 6 | 7 | 10 | 12 | 8 | 51 |
| Notched Izod Impact Strength ft-lbs/in of notch | 1.2 | 0.85 | 0.73 | 1.0 | 1.3 | 3.5 |
| Mechanical Properties (50% R.H. Conditioning for 25 days) | | | | | | |
| Tensile Modulus (psi) | 183,000 | 190,000 | 182,000 | 144,000 | 38,000 | 37,000 |
| Tensile Strength (psi) | 5,600 | 5,000 | 5,200 | 3,500 | 1,900 | 2,300 |
| Elongation @ Break (%) | 6 | 6 | 12 | 13 | 31 | 198 |
| Notched Izod Impact Strength ft-lbs/in of notch | 1.1 | 0.66 | 0.59 | 0.92 | 1.9 | 7.7 |

| Run | 91 | 92 | 93 | 94 | 95 | 96 | 97 | 98[#] |
|---|---|---|---|---|---|---|---|---|
| Vinex ™ Type | 2025 | 2025 | 2025 | 2025 | 2025 | 2025 | 2034 | 2034[#] |
| Vinex Feed Rate (lbs/hr) | 40 | 40 | 54 | 54 | 54 | 54 | 60 | 60 |
| Polyolefin Type | EVA LD-706 | EVA LD-706 | EPR 3708 | EPR 3708 | EPR 3708 | EPR 3708 | PP Profax 6723 | PP Profax 6723 |
| Polyolefin Feed Rate (lbs/hr) | 40 | 40 | 36 | 36 | 36 | 36 | 40 | 40 |
| Maleic Anhydride Conc. (%)* | 0.8% | 1.0% | — | 0.4% | 0.9% | 1.0% | 2.2% | 1.0% |
| L-101 (peroxide) Conc. (ppm)* | 800 | 1200 | — | 400 | 900 | 1200 | 3000 | 2000 |
| Melt flow dg/min (200° C.) | 5.2(10P) 2.5(10P) | 3.9(10P) | 2.1(1P) | 1.9(1P) | 2.4(10P) | | 36.0(5P) | 4.7(1P) |
| Mechanical Properties (Dry) | | | | | | | | |
| Tensile Modulus (psi) | 88,000 | 124,000 | 138,0000 | 137,000 | 112,000 | 137,000 | 109,000 | 124,000 |
| Tensile Strength (psi) | 3,100 | 3,700 | 3,300 | 3,400 | 3,800 | 4,400 | 4,800 | 2,400 |
| Elongation @ Break (%) | 60 | 61 | 5 | 6 | 129 | 129 | 48 | 7 |
| Notched Izod Impact Strength ft-lbs/in of notch | 3.1 | 7.9 | 1.2 | 0.94 | 20.1 | 21.1 | 0.86 | 0.77 |
| Mechanical Properties (50% R.H. Conditioning for 25 days) | | | | | | | | |
| Tensile Modulus (psi) | 37,000 | 43,000 | 70,000 | 70,000 | 36,000 | 63,000 | 78,000 | 86,000 |
| Tensile Strength (psi) | 2,500 | 2,600 | 2,100 | 2,100 | 2,700 | 3,000 | 3,900 | 2,100 |
| Elongation @ Break (%) | 216 | 170 | 13 | 21 | 388 | 373 | 333 | 12 |
| Notched Izod Impact Strength ft-lbs/in of notch | N.B.** | N.B.** | 1.7 | 1.8 | N.B.** | N.B.** | 1.4 | 0.96 |

*Based on polyolefin weight
**N.B. = No Break
[#]Vinex 2025 fed to barrel 1

STATEMENT OF INDUSTRIAL APPLICATION

The present invention provides a process for the reactive melt extrusion grafting of polyolefin/thermoplastic PVOH blends which are suitably used in barrier films, foam, injection molded articles and extrusion applications.

We claim:

1. A method for preparing a compatible blend of polyolefin and thermoplastic polyvinyl alcohol comprising performing the following steps in a single pass through a melt extruder:
   (a) melting polyolefin in a melt extruder,
   (b) melt blending an unsaturated carboxylic acid or anhydride with the melted polyolefin,
   (c) adding a free radical source to the melt blend and grafting the unsaturated carboxylic acid or anhydride onto the polyolefin, and
   (d) melt blending thermoplastic PVOH into the grafted polyolefin/unsaturated carboxylic acid or anhydride melt mixture.

2. The method of claim 1 in which the polyolefin is polypropylene.

3. The method of claim 1 in which the polyolefin is a polyethylene or an ethylene copolymer.

4. The method of claim 1 in which the polyolefin is an ethylene-propylene copolymer.

5. The method of claim 1 in which the polyvinyl alcohol is at least 70 mole % hydrolyzed.

6. The method of claim 5 in which the polyvinyl alcohol is the hydrolysis product of a vinyl acetate copolymer which is at least 70 wt % vinyl acetate.

7. The method of claim 1 in which the polyolefin has a melt index value of 0.01 to 200 dg/min at 3.1 kg/cm$^2$ and the polyvinyl alcohol has a degree of polymerization ranging from 200 to 4,000.

8. The method of claim 1 in which the blend comprises 10–80 wt % polyolefin and 20–90 wt % polyvinyl alcohol.

9. The method of claim 1 in which the unsaturated carboxylic acid or anhydride is maleic anhydride.

10. A method for preparing a compatible blend of polyolefin and thermoplastic polyvinyl alcohol which comprises performing the following steps in a single pass through a melt extruder:
   (a) melting 10 to 80 wt %, based on total polyolefin/polyvinyl alcohol blend, of a polyolefin having a melt index value of 0.01 to 200 dg/min at 3.1 kg/cm$^2$ in a melt extruder,
   (b) melt blending 0.1 to 4 wt % maleic anhydride, based on polyolefin, with the melted polyolefin,
   (c) adding a free radical source to the melt blend and grafting the maleic anhydride onto the polyolefin, and
   (d) melt blending 20 to 90 wt %, based on total polyolefin/polyvinyl alcohol blend, of a thermoplastic PVOH, which is 78 to 94 mole % hydrolyzed and has a degree of polymerization in the range of 200 to 4000, into the grafted polyolefin/maleic anhydride melt mixture.

11. The method of claim 10 in which the polyolefin is polypropylene.

12. The method of claim 10 in which the polyolefin is a polyethylene or ethylene copolymer.

13. The method of claim 10 in which the polyolefin is an ethylene-propylene copolymer.

14. The method of claim 10 in which the blend comprises 25 to 75 wt % of a polyolefin having a melt index value of 0.5 to 40 dg/min at 3.1 kg/cm$^2$ and 25 to 75 wt % of a polyvinyl alcohol having a degree of polymerization in the range of 300 to 1500.

15. In a melt processable polyolefin/polyvinyl alcohol composition comprising 10 to 80 wt % polyolefin and 20 to 90 wt % polyvinyl alcohol and prepared by reacting polyvinyl alcohol with a functional polyolefin, the improvement which comprises the composition being prepared by a single pass reactive extrusion process in which an unsaturated carboxylic acid or anhydride is melt blended with a polyolefin, a free radical source is added to the melt blend to graft the unsaturated carboxylic acid or anhydride to the polyolefin, and thermoplastic polyvinyl alcohol is melt blended into the grafted polyolefin melt.

16. The composition of claim 15 in which the polyolefin has a melt index of 0.01 to 200 dg/min at 3.1 kg/cm$^2$ and the polyvinyl alcohol is at least 70 mole % hydrolyzed and has a degree of polymerization ranging from 200 to 4,000.

17. The composition of claim 16 in which the unsaturated carboxylic acid or anhydride is maleic anhydride.

18. The composition of claim 17 in which the polyolefin has a melt index of 0.5 to 40 dg/min at 3.1 kg/cm$^2$ and the polyvinyl alcohol is 78 to 94 mole % hydrolyzed and has a degree of polymerization ranging from 300 to 1500.

19. The composition of claim 18 in which the polyolefin is polypropylene.

20. The composition of claim 18 in which the polyolefin is a polyethylene or ethylene copolymer.

21. The composition of claim 18 in which the polyolefin is an ethylene-propylene copolymer.

* * * * *